United States Patent [19]

Sievert

[11] 4,341,969
[45] Jul. 27, 1982

[54] DIRECT CURRENT MOTOR WITH IMPROVED POLE PIECE THAT REDUCES COGGING

[75] Inventor: Dale W. Sievert, Freeport, Ill.

[73] Assignee: Honeywell Inc., Minneapolis, Minn.

[21] Appl. No.: 211,887

[22] Filed: Dec. 1, 1980

[51] Int. Cl.³ .......................................... H02K 23/42
[52] U.S. Cl. .................................... 310/154; 310/254
[58] Field of Search ............ 310/154, 256, 156, 68 R, 310/152

[56] References Cited

U.S. PATENT DOCUMENTS 3,469,129 9/1969 Humphries .......................... 310/154
3,663,851 5/1972 Persson ............................... 310/154

Primary Examiner—J. D. Miller
Assistant Examiner—D. L. Rebsch
Attorney, Agent, or Firm—Laurence J. Marhoefer

[57] ABSTRACT

A direct current motor having pole pieces in the shape of partial cylinders each having an inner surface terminating in a leading and trailing edge. A series of notches are formed along the edges of the pole pieces so that each of the edges alternately slopes toward and away from the center of the inner arc surface of the pole piece.

17 Claims, 7 Drawing Figures

DIRECT CURRENT MOTOR WITH IMPROVED POLE PIECE THAT REDUCES COGGING

BACKGROUND OF THE INVENTION

This invention relates to direct current, permanent magnet motors, and more particularly to a motor with an improved field pole which substantially reduces cogging.

Direct current permanent magnet motors are used in a wide variety of applications including servo motor and other control applications. Such motors typically have two or more permanent magnet poles to create a magnet field and an armature rotatably mounted in the field. The armature has a series of bars or teeth evenly spaced around its periphery. Conductors wound in slots formed between the bars carry the energizing current for the motor. Usually the armature of such motors is constructed from a series of discs or laminas stacked on a shaft.

As those skilled in the art will appreciate, the magnetic attraction between the permanent magnet pole pieces and the armature bars vary as the bar moves into proximity with the edge of the pole piece. This variable attraction produces an effect called cogging.

Cogging has two deleterious manifestations. One is a variable torque characteristic, and the other is a preferred stable positional relationship between the armature and the pole piece.

There have been a number of proposals in the prior art for reducing, and or eliminating cogging. One prior art proposal, which is widely used is to skew the armature with respect to the edges of the pole pieces. If the skew is equal to the bar pitch, cogging can be substantially eliminated. The drawbacks of this approach include the fact that motors with skewed armatures are somewhat more difficult to manufacture than those with axially aligned armatures, and the number of conductors which can be fitted into a skewed armature slot is somewhat reduced.

At least two other proposals have been made in the prior art as alternatives to skewing the armature in order to eliminate cogging. One prior art proposal is to shave or cut the edges of the pole piece in order to achieve an effect similar to that achieved by skewing the armature. The other is to skew the pole piece itself. Neither of these proposals has proved altogether satisfactory.

Another approach to eliminate cogging is shown in U.S. Pat. No. 3,604,961. This approach cancels the positive and negative cogging effects generated by the armature bars as they respectively enter and leave the pole piece by locating the pole pieces eccentrically with respect to a plane of symmetry. Again, this approach is not proven altogether satisfactory.

An object of this invention is to provide a permanent magnet motor which does not have a tendency to cog, and can be manufactured economically.

Briefly, this invention contemplates a permanent magnet DC motor which has a series of notches or cutouts along the edges of its permanent magnet field poles. These notches have been found to substantially reduce or eliminate cogging without adding to the cost of the motor.

DESCRIPTION OF DRAWINGS

FIG. 2b is a plane view of the field pole shown in FIG. 2a;

DESCRIPTION OF THE INVENTION

Figure 1:
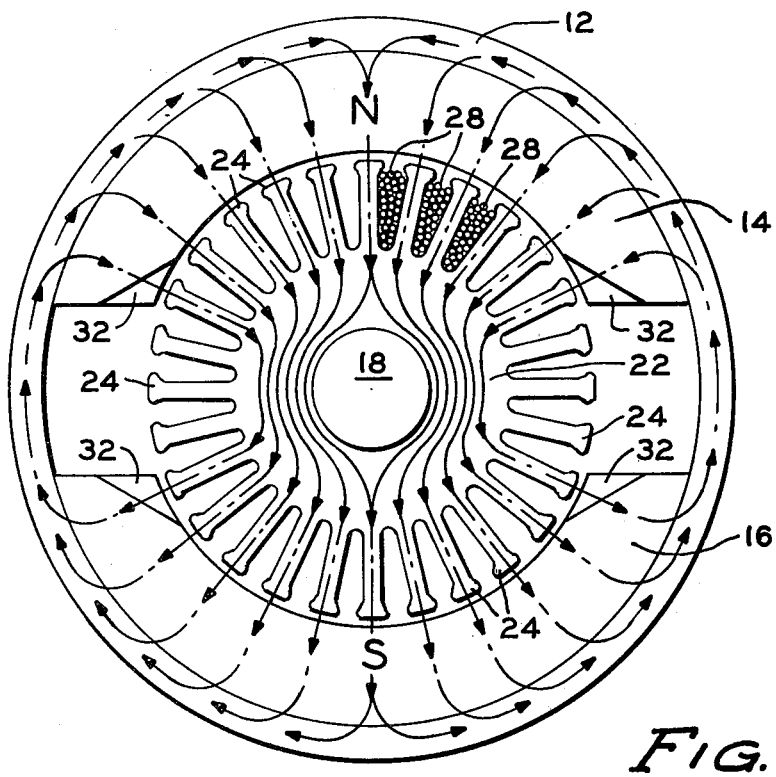
FIG. 1 is a diagramatic end view of a two pole permanent magnet motor with parts omitted for the sake of clarity.

Referring now to FIG. 1 of the drawings, a permanent magnet motor has a magnetically permeable housing 12 which supports a pair of partially cylindrical permanent field poles 14 and 16. A shaft 18 support an armature 22 which has a series of uniformly spaced bars or teeth 24 distributed around its periphery. Electrical conductors 28, (only a few of which are shown in FIG. 1 for the purposes of clarity) are wound in the troughs or slots between the bars 24. This winding is connected to commutator segments (not shown) to which energy is supplied by means of commutator brushes (not shown) in order to provide the electrical energy for driving the motor.

As will be appreciated by those skilled in the art, the plates and bearings afixed to the housing 12 rotatably support the shaft 18 in axial alignment with the partially cylindrical pole pieces. The armature bars 24 rotate in close proximity to the field poles 14 and 16. As the structural details for supporting the armature in relation to the field poles is well known in the art they have been omitted here for the sake of clarity.

The permanent magnet DC motors thus far described is representative of conventional prior art motors. The torque produced by the magnetic attraction between the pole pieces 14 and 16, and the armature bars 24, varies rapidly as each armature bar approaches the edge of the permanent magnet pole piece. This variable torque produces the so called cogging effect. It will be appreciated that the attraction, and thus the torque, between a single lamina of the armature, and the pole piece is relatively small. However, in a conventional motor, each bar approaches the edge of the pole piece uniformly throughout its entire length, and the attraction between the pole piece and each lamina is accumulative. This results in a relatively large, sharply defined cogging torque. It should be noted that there is a variation in the attractive force between the armature bars 24 and the pole pieces 14 and 16, both as a bar passes under, and as a bar leaves the edge of the pole piece. This variable attraction produces a variable torque as described above. The torque produced as the bar passes out from under the edge of the pole piece is oppositely directed with respect to the torque produced as a bar approaches the edge of that same pole piece. However, in counter motors these conventionally directed torques are so sharply defined that they do not reliably cancel.

Figure 2A:
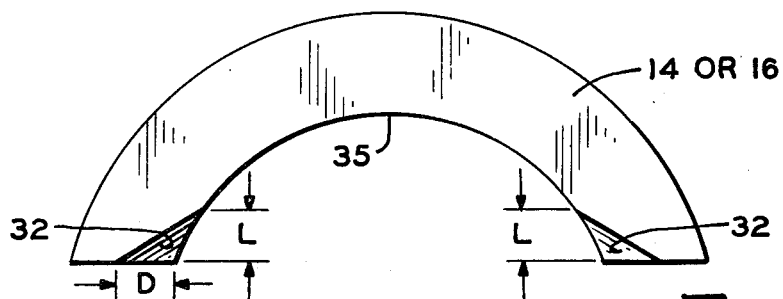
FIG. 2a is side view of a permanent magnet field pole constructed in accordance with the teachings of this invention.
Figure 2B:
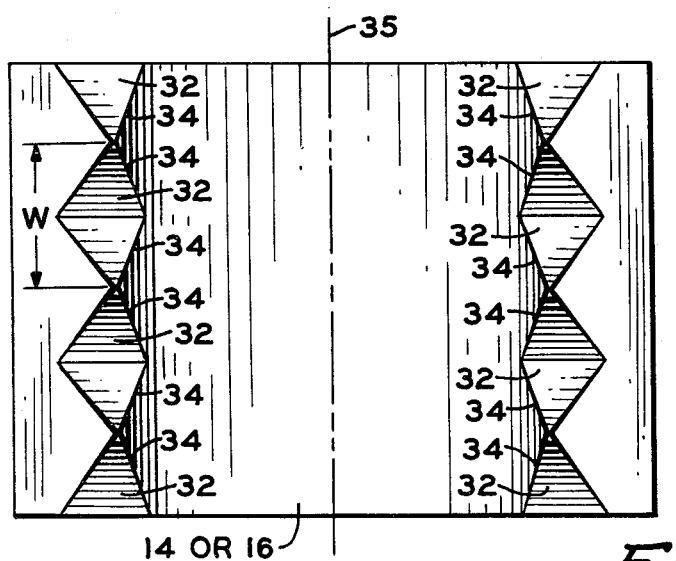

Referring now to FIGS. 2a and 2b, in accordance with the teachings of this invention, a series of cutouts or notches 32 are formed along the edges of the pole pieces 14 and 16; the two pole pieces are interchangeable. As will be described more fully below, the provision of these notches in the pole pieces substantially reduce and or eliminate cogging. It should be noted that the notched pole pieces can be used in place of conventional pole pieces in a wide variety of permanent magnet DC motors without materially altering the manufacturing procedures for such motors or materially adding to their cost.

With respect to the notches themselves, preferably, the length (L) of the notch, measured from the edge of the inner arc surface of the pole piece, is equal to the distance between the corresponding points on adjacent armature bars (that is, the bar pitch). If the length of the notch is not equal to the bar pitch there will still be a reduction in cogging. However, in general the results will not be as good as where the length is equal to the bar pitch.

The notch depth (D) and the notch width (W) are not critical and can be made any convenient dimension.

The notches form a series of straight edges 34 on the inner surface of the pole piece so that the length of an armature bar entering or leaving the inner surface of a pole piece increases or decreases linearly. It should be noted that as viewed from top to bottom in FIG. 2b, for example, the edges 34 alternatively slope away from and toward the center line 35 of the inner arc surface of the pole piece 14 or 16. If the edges are not straight there would still be a reduction in the cogging, however, in general the results would not be as satisfactory as if straight edges.

Figure 3:
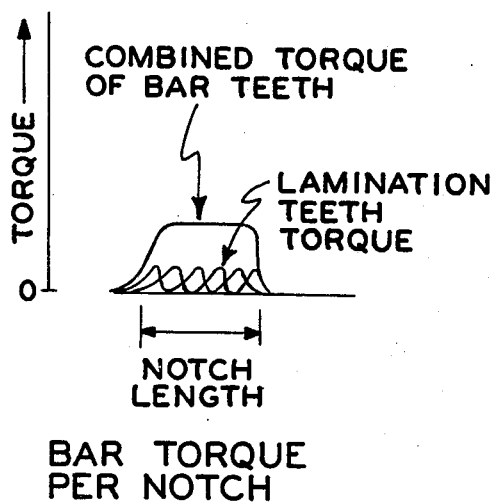
FIG. 3 is a graph showing torque versus position of an armature bar as it passes under the edge of a permanent magnet field pole constructed in accordance with this invention.
Figure 4:
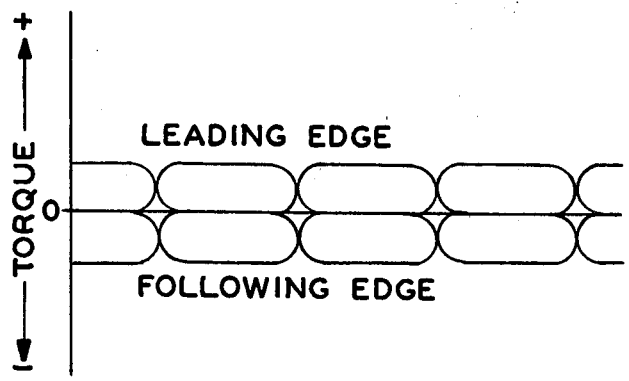
FIG. 4 is a graph showing torque versus the position of two armature bars with respect to the edges of a field pole constructed in accordance with this invention; one bar entering under the field pole, and the other leaving it.

Referring now to FIG. 3, it will be appreciated that through the use of pole pieces shown in FIG. 2a and 2b, the maximum torque upon a armature bar entering the region of the edge of the pole piece is reduced to a value which is approximately that fraction of the torque produced by a single lamina passing under the edge multiplied by the number of edges 32 formed by the notches. In addition, the bar produces a relatively uniform torque over a distance equal to the bar pitch. As is shown in FIG. 4, this spreading allows for a further reduction in cogging due to a substantial cancellation between oppositely directed torques as the armature bars pass under and leave the edge of the pole piece provided the length of the inner surface of the pole piece is equal to an integral number of bar pitch distances. In this way cogging can be reduced substantially to zero.

Figure 5:
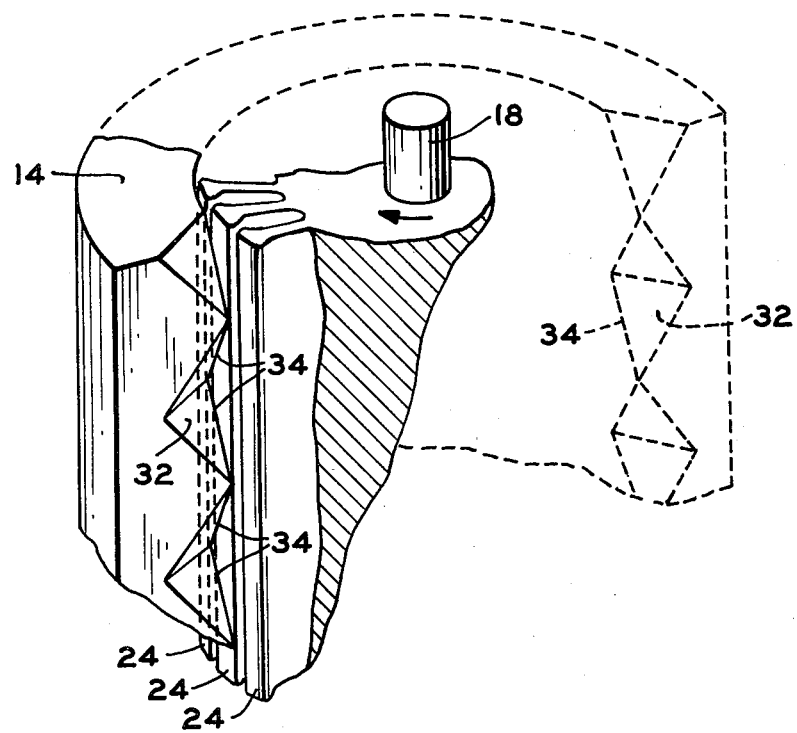
FIG. 5 is a fragmentary perspective view of an armature and a pole piece constructed in accordance with this invention.

Referring now to FIG. 5, in operation, as the armature 22 rotates in a counterclockwise direction, for example, successive edges 34 of the pole piece, as viewed from one end of the pole piece to the other, alternatively slope toward and away from the oncoming armature bars 24. As explained above, this reduces the overall cogging torque generated at each edge to a value approximately equal of a single lamina passing under the edge times the number of edges. In addition, it spreads the torque so that the oppositely directed torques produced by the bars passing under and leaving the edges of the pole piece substantially cancelled.

Figure 6:
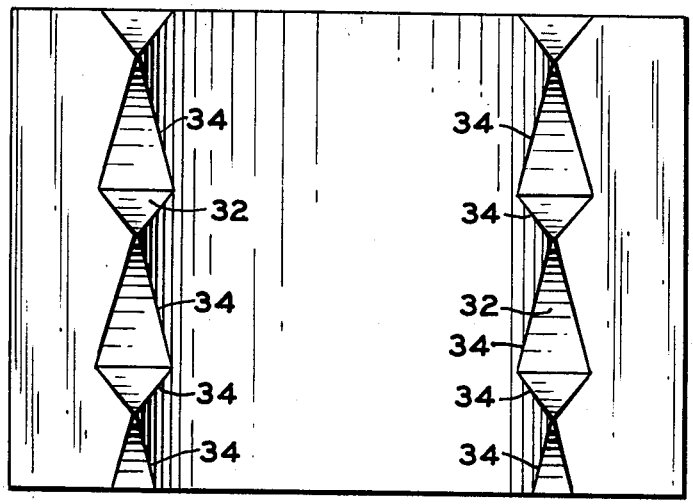
FIG. 6 is a plane view similar to FIG. 2b of an alternative embodiment of the invention.

The notches 34 need not be symmetrical as shown in FIGS. 2a and 2b. They may be sawtooth, for example, as shown in FIG. 6. As illustrated in FIG. 2b and FIG. 6, it is not necessary that there be a full notch at either end of the pole piece, and if there is a partial notch at one end of the pole piece it is not necessary that there be the same partial notch at the other end of the pole piece. This aspect of the invention provides certain important benefits.

While the pole pieces themselves and the notches 32 may be formed in any suitable manner known in the art, such as by cutting or grinding, the practice of this invention particularly well suited for use with ceramic magnet of the type commonly used in DC permanent magnet motors. Such ceramic magnets, which are well known in the art, start with a ferrite slurry which is molded into a desired arc shape. It is convenient to mold such magnets in fairly long lengths, and then cut them to a length for a particular motor. It will be appreciated that pole pieces in accordance with this invention can be conveniently manufactured using conventional ferrite molding techniques by merely modifing the forms so that the notches are molded into the arc. Since it is not necessary that a fully notch be at either end of the pole piece or that the partial notch at either end be the same, a single relatively long magnet can be molded, as in the prior art, and then cut to any desired length.

Those skilled in the art will recognize that only preferred embodiments of the present invention is disclosed herein and that the embodiment may be altered and modified without departing from the true spirit and scope of the invention as defined in the accompanying claims.

What is claimed is:

1. A permanent magnet direct current motor comprising in combination:
   a permanent magnet pole piece in the shape of a partial cylinder with an inner surface terminating in a leading edge and a trailing edge;
   an armature having a series of armature bars disposed around its periphery;
   means supporting said armature and said pole piece so that as said armature rotates said bars pass the edges of said pole piece;
   a series of notches formed in said pole piece along said leading and trailing edges so that each of said edges respectively alternately slopes toward and away from an armature bar passing under it.

2. A permanent magnet direct current motor as in claim 1 wherein the depth of the notches is equal to the distance between adjacent armature bars.

3. A permanent magnet direct current motor as in claim 1 wherein said sloping edges are straight.

4. A permanent magnet direct current motor as in claim 1 wherein the slope of said edges sloping toward said armature bar is the same as the slope of said edges sloping away from the said armature bar.

5. A permanent magnet direct current motor as in claim 1 wherein the slope of said edges sloping away from said armature bar is different from the slope of said edges sloping toward said armature bar.

6. A permanent magnet direct current motor as in claim 1 wherein said pole piece and said notches are formed by a molding process.

7. A pole piece for a permanent magnet direct current motor comprising;

a permanent magnet pole piece in the shape of a partial cylinder with an inner surface terminating in a leading edge and a trailing edge;

a series of notches in said pole piece along said leading and trailing edges formed so that each of said edges respectively alternately slopes toward and away from the inner arc surface of said pole piece.

8. A pole piece for a permanent magnet direct current motor as in claim 7 wherein said sloping edges are straight edges.

9. A pole piece for a permanent magnet direct current motor as in claim 8 wherein the slope of said edges sloping toward the center of said pole piece is the same as the slope of said edges sloping away from said center.

10. A pole piece for a permanent magnet direct current motor as in claim 8 wherein the slope of said edges sloping toward said center is different from the slope of said edges sloping away from said center.

11. A permanent magnet pole piece for a direct current motor as in claim 8 wherein said pole piece and said notches are formed by a molding process.

12. A direct current motor comprising in combination: a pole piece;

an armature having a series of armature bars disposed around its periphery;

means supporting said armature and said pole piece; and a series of notches formed in said pole piece along at least one edge thereof.

13. A direct current motor as in claim 12 wherein the depth of the notches is a function of the distance between adjacent armature bars.

14. A direct current motor as in claim 13 wherein said pole piece and said notches are formed by a molding process.

15. A direct current motor comprising in combination:

a permanent magnet pole piece with its inner surface terminating in a leading edge and a trailing edge;

an armature having a series of armature bars disposed around its periphery;

means supporting said armature and said pole piece so that as said armature rotates said bars pass said edges of said pole piece;

a series of notches formed in said pole piece along said leading and trailing edges so that each of said edges respectively alternately slopes toward and away from an armature bar passing under it.

16. Direct current motor as in claim 15 wherein the depth of the notches is a function of distance between adjacent armature bars.

17. A pole piece for a direct current motor comprising;

a pole piece with an inner surface terminating in a leading edge and a trailing edge;

a series of notches in said pole piece along said leading and trailing edges formed so that each of said edges respectively alternately slopes toward and away from the center of said pole piece.

* * * * *